(12) United States Patent
Gobara

(10) Patent No.: US 8,724,593 B2
(45) Date of Patent: May 13, 2014

(54) CAPTURE FREQUENCY DECISION METHODS AND RECEIVERS

(75) Inventor: Naoki Gobara, Shiojir (JP)

(73) Assignee: Seiko Epson Corporation, Tokyo (JP)

( * ) Notice: Subject to any disclaimer, the term of this patent is extended or adjusted under 35 U.S.C. 154(b) by 352 days.

(21) Appl. No.: 12/953,317

(22) Filed: Nov. 23, 2010

(65) Prior Publication Data

US 2011/0122894 A1    May 26, 2011

(30) Foreign Application Priority Data

Nov. 24, 2009  (JP) ................................. 2009-265997

(51) Int. Cl.
*H04W 4/00* (2009.01)

(52) U.S. Cl.
USPC .......................................... 370/332; 370/333

(58) Field of Classification Search
USPC .......... 370/335, 342, 350, 324, 328, 332, 333
See application file for complete search history.

(56) References Cited

U.S. PATENT DOCUMENTS

| | | | |
|---|---|---|---|
| 7,978,131 B2 | 7/2011 | Ahmed et al. | |
| 2002/0064217 A1* | 5/2002 | Ohsuge | 375/152 |
| 2004/0078140 A1* | 4/2004 | Rowitch et al. | 701/213 |
| 2007/0109189 A1* | 5/2007 | Jia et al. | 342/357.15 |
| 2007/0222676 A1* | 9/2007 | Uchida | 342/357.12 |
| 2008/0062040 A1* | 3/2008 | Gobara | 342/357.01 |

FOREIGN PATENT DOCUMENTS

| | | | |
|---|---|---|---|
| JP | 2004-012378 A | 1/2004 | |
| JP | 2009-103489 A | 5/2009 | |
| JP | 2009-537849 A | 10/2009 | |

* cited by examiner

*Primary Examiner* — Gary Mui
*Assistant Examiner* — Kabir Jahangir
(74) *Attorney, Agent, or Firm* — Kilpatrick Townsend & Stockton LLP

(57) ABSTRACT

A capture frequency decision method of deciding a capture frequency by executing a frequency search in which a correlation operation on a received signal, which is a CDMA (Code Division Multiple Access) signal, is performed at a plurality of search frequencies, includes: executing a first frequency search; setting a frequency for a side lobe check on the basis of a correlation integration time used in the first frequency search; selecting a plurality of search frequencies including the frequency for a side lobe check on the basis of a result of the first frequency search; executing a second frequency search of performing the correlation operation at the plurality of selected search frequencies; and deciding a capture frequency by executing a third frequency search using a result of the second frequency search.

10 Claims, 15 Drawing Sheets

| FIRST TYPE CORRELATION INTEGRATION TIME | | |
|---|---|---|
| 10ms | 20ms | |
| { f_p−100, f_p−50, f_p, f_p+50, f_p+100 } | { f_p−50, f_p−25, f_p, f_p+25, f_p+50 } | ... |

FIG. 4

| ELECTRIC FIELD ENVIRONMENT | SECOND TYPE CORRELATION INTEGRATION TIME | | |
|---|---|---|---|
| | 10ms | 20ms | |
| FIRST | { $f_p-50, f_p-10, f_p, f_p+10, f_p+50$ } | { $f_p-25, f_p-5, f_p, f_p+5, f_p+25$ } | ... |
| SECOND | [ $f_p-\Delta f, f_p-50, f_p-10, f_p, f_p+10, f_p+50, f_p+\Delta f$ ] | [ $f_p-\Delta f, f_p-25, f_p-5, f_p, f_p+5, f_p+25, f_p+\Delta f$ ] | ... |

| STEP | SECOND TYPE CORRELATION INTEGRATION TIME | |
|---|---|---|
| | 10ms | 20ms |
| MAIN/SIDE DETERMINATION STEP | {$f_p-\Delta f, f_p-50, f_p-10, f_p+10, f_p+50, f_p+\Delta f$} | ... |
| TRANSITION STEP | {$f_p-\Delta f, f_p-25, f_p-5, f_p, f_p+5, f_p+25, f_p+\Delta f$} | {$f_p-\Delta f, f_p-25, f_p-5, f_p, f_p+5, f_p+25, f_p+\Delta f$} | ... |
| MAIN SEARCH STEP | {$f_p-\Delta f, f_p-12.5, f_p-2.5, f_p, f_p+2.5, f_p+12.5, f_p+\Delta f$} | {$f_p-\Delta f, f_p-12.5, f_p-2.5, f_p, f_p+2.5, f_p+12.5, f_p+\Delta f$} | ... |
| | {$f_p-\Delta f, f_p-6.25, f_p-1.25, f_p, f_p+1.25, f_p+6.25, f_p+\Delta f$} | ... |

257

| STEP | SECOND TYPE CORRELATION INTEGRATION TIME | |
|---|---|---|
| | 10ms | 20ms |
| MAIN/SIDE DETERMINATION STEP | {$f_p-\Delta f, f_p-50, f_p-10, f_p, f_p+10, f_p+50, f_p+\Delta f$} | {$f_p-\Delta f, f_p-25, f_p-5, f_p, f_p+5, f_p+25, f_p+\Delta f$} |
| TRANSITION STEP | {$f_p-\Delta f, f_p-50, f_p-20, f_p-10, f_p, f_p+10, f_p+20, f_p+50, f_p+\Delta f$} | {$f_p-\Delta f, f_p-25, f_p-12.5, f_p-5, f_p, f_p+5, f_p+12.5, f_p+25, f_p+\Delta f$} |
| MAIN SEARCH STEP | {$f_p-\Delta f, f_p-50, f_p-30, f_p-20, f_p-10, f_p, f_p+10, f_p+20, f_p+30, f_p+50, f_p+\Delta f$} | {$f_p-\Delta f, f_p-25, f_p-15, f_p-12.5, f_p-5, f_p, f_p+5, f_p+12.5, f_p+15, f_p+25, f_p+\Delta f$} |

CAPTURE FREQUENCY DECISION METHODS AND RECEIVERS

This application claims priority to Japanese Patent Application No. 2009-265997, filed Nov. 24, 2009, the entirety of which is herein incorporated by reference for all purposes.

BACKGROUND

1. Technical Field

The present invention relates to a capture frequency decision methods and receivers.

2. Related Art

A GPS (global positioning system) is widely known as a positioning system using a positioning signal and is used for a GPS receiver built into a mobile phone, a car navigation apparatus, or the like. The GPS receiver performs a position calculation process for calculating the three-dimensional coordinate values, which indicates the position of the receiver, and a clock error on the basis of the information, such as the positions of a plurality of GPS satellites or a pseudo distance from each GPS satellite to the receiver.

A GPS satellite signal is a kind of communication signal spread-modulated by the CDMA (Code Division Multiple Access) method which is known as a spread spectrum modulation method. A frequency (carrier frequency) when a GPS satellite transmits a GPS satellite signal is 1.57542 [GHz], but the frequency when a GPS receiver actually receives the GPS satellite signal does not necessarily match the carrier frequency due to the Doppler effect or the like caused by movement of the GPS satellite and/or the receiver. For this reason, the GPS receiver searches for a frequency for capturing a GPS satellite signal from a received signal to decide a capture frequency.

In general, the capture frequency is decided by performing a correlation operation between a received signal and a signal of a spread code replica, which simulates a spread code of a GPS satellite signal, while changing a frequency (correlation operation in the frequency direction). For example, U. S. Patent Application Publication No. 2007/0109189 discloses a technique of searching for a capture frequency on the basis of a frequency change when a correlation operation is performed for a predetermined integration time.

The technique disclosed in U.S. Patent Application Publication No. 2007/0109189 is a technique specialized when the integration time is fixed. In practice, however, the integration time may change. For example, the integration time may be variably controlled according to the receiving environment (for example, outdoors or indoors) of a receiver or the signal strength of a received signal. A portion (peak at which a correlation operation result becomes a maximum) equivalent to a main lobe and a portion (peak at which a correlation operation result is not a maximum) equivalent to a side lobe are present in a correlation operation result. The peak of the portion equivalent to a side lobe is not a correct peak. For this reason, it leads to a reduction in the time taken to calculate the current position, and an accurate position calculation to search a correct peak by quickly extracting a portion equivalent to a main lobe from the correlation operation result.

SUMMARY

An advantage of some aspects of the invention is to propose new methods and receivers for acquiring a capture frequency correctly and efficiently.

According to a first aspect of the invention, a capture frequency decision method of deciding a capture frequency by executing a frequency search in which a correlation operation on a received signal, which is a CDMA (Code Division Multiple Access) signal, is performed at a plurality of frequencies includes: executing a first frequency search; setting a frequency for a side lobe check on the basis of a correlation integration time used in the first frequency search; selecting a plurality of search frequencies including the frequency for a side lobe check on the basis of a result of the first frequency search; executing a second frequency search of performing the correlation operation at the plurality of selected search frequencies; and deciding a capture frequency by executing a third frequency search using a result of the second frequency search.

According to another aspect of the invention, a receiver that captures a CDMA signal, which is a received signal, by deciding a capture frequency by executing a frequency search of performing a correlation operation on the CDMA signal in a frequency direction includes: a first search executing section that executes a first frequency search; a setting section that sets a frequency for a side lobe check on the basis of a correlation integration time used in the first frequency search; a second search frequency selecting section that selects a plurality of search frequencies including the frequency for a side lobe check on the basis of a result of the first frequency search; a second frequency search executing section that executes a second frequency search of performing the correlation operation at the plurality of selected search frequencies; and a capture frequency deciding section that decides a capture frequency by executing a third frequency search using a result of the second frequency search.

According to the first and the like aspects of the invention, the first frequency search is executed on the received signal which is a CDMA signal. The frequency for a side lobe check is set on the basis of the correlation integration time used in the first frequency search, and a plurality of search frequencies including the frequency for a side lobe check are selected on the basis of the result of the first frequency search. The second frequency search of performing the correlation operation at the plurality of selected search frequencies is executed, and the capture frequency is decided by executing the third frequency search using the result of the second frequency search.

First, a frequency is searched roughly as the first frequency search. Then, the second frequency search is executed at the selected search frequency on the basis of the result. Moreover, a capture frequency can be calculated (e.g., determined) correctly and efficiently by gradually narrowing a distance between frequencies, which is to search for a frequency in detail, as the third frequency search using the result of the second frequency search. By setting a frequency for a side lobe check on the basis of the correlation integration time used in the first frequency search and executing the second frequency search at search frequencies including the frequency for a side lobe check, it is possible to prevent a frequency of a side lobe portion from being erroneously detected as a capture frequency.

According to a second aspect of the invention, in the capture frequency decision method according to the first aspect of the invention, the setting of the frequency for a side lobe check may include setting the frequency for a side lobe check using a difference between frequencies of a main lobe and a side lobe set according to the correlation integration time, and the executing of the third frequency search may include executing a frequency search on the basis of a search frequency which is acquired by the second frequency search and at which a correlation value is a maximum.

According to the second aspect of the invention, the frequency for a side lobe check is set using the difference between the frequencies of the main lobe and the side lobe set according to the correlation integration time. The third frequency search is executed on the basis of the search frequency which is acquired by the second frequency search and at which the correlation value is a maximum. By setting the frequency for a side lobe check using the difference between frequencies of the main lobe and the side lobe, a side lobe check can be performed appropriately and easily.

According to a third aspect of the invention, the capture frequency decision method according to the first or second aspect of the invention may further include: executing the second frequency search again by selecting new search frequencies including a new frequency for a side lobe check on the basis of the frequency for a side lobe check when the search frequency, which is acquired by the second frequency search and at which the correlation value is a maximum, is the frequency for a side lobe check.

According to the third aspect of the invention, when the search frequency, which is acquired by the second frequency search and at which the correlation value is a maximum, is the frequency for a side lobe check, the second frequency search is executed again by selecting new search frequencies including a new frequency for a side lobe check on the basis of the frequency for a side lobe check. If the result of the second frequency search shows that the search frequency at which the correlation value is a maximum is a frequency for a side lobe check, it means that a frequency of the main lobe was not detected in the second frequency search. Accordingly, it is proper to redo the second frequency search by selecting new search frequencies including a new frequency for a side lobe check.

According to a fourth aspect of the invention, in the capture frequency decision method according to the third aspect of the invention, the executing of the second frequency search again may include setting the new frequency for a side lobe check to a larger frequency than a search frequency, at which the correlation value is a maximum in the second frequency search already executed, when the search frequency at which the correlation value is a maximum in the second frequency search already executed is larger than a search frequency at which the correlation value is a maximum in the first frequency search.

According to a fifth aspect of the invention which is opposite to the fourth aspect of the invention, in the capture frequency decision method according to the third aspect of the invention, the executing of the second frequency search again may include setting the new frequency for a side lobe check to a smaller frequency than a search frequency, at which the correlation value is a maximum in the second frequency search already executed, when the search frequency at which the correlation value is a maximum in the second frequency search already executed is smaller than a search frequency at which the correlation value is a maximum in the first frequency search.

According to the fourth or fifth aspect of the invention, for the search frequency at which the correlation value is a maximum in the second frequency search already executed, a new frequency for a side lobe check is set at the opposite side to a search frequency range of the first frequency search. As a result, a frequency for a side lobe check can be efficiently set.

According to a sixth aspect of the invention, the capture frequency decision method according to any one of the first to fifth aspects of the invention may further include: determining whether or not the frequency for a side lobe check is used in the second frequency search on the basis of a signal strength of the received signal. In the executing of the second frequency search, the correlation operation may be performed at a plurality of search frequencies including the frequency for a side lobe check when it is determined that the frequency for a side lobe check is used, and the correlation operation may be performed at a different search frequency from the frequency for a side lobe check when it is determined that the frequency for a side lobe check is not used.

According to the sixth aspect of the invention, on the basis of the signal strength of the received signal, it is determined whether or not the frequency for a side lobe check is used in the second frequency search. When the determination result shows that the frequency for a side lobe check is used, the correlation operation is performed at a plurality of selected search frequencies including the frequency for a side lobe check. When the determination result shows that the frequency for a side lobe check is not used, the correlation operation is performed at a different search frequency from the frequency for a side lobe check.

For example, in the electric field environment where the received CDMA signal becomes a weak signal, a difference of a main lobe and a side lobe may not appear clearly in the correlation value calculated (e.g., generated) by the correlation operation. In this case, a side lobe check using the frequency for a side lobe check cannot be performed correctly. Therefore, it is efficient to determine whether or not a frequency for a side lobe check is used on the basis of the signal strength of a received signal and to perform the correlation operation by changing a search frequency according to the determination result.

According to a seventh aspect of the invention, in the capture frequency decision method according to any one of the first to sixth aspects of the invention, the selecting of the plurality of search frequencies may include selecting a frequency, which is selected using a search frequency pattern used when selecting a search frequency on the basis of a predetermined reference frequency, and the frequency for a side lobe check as search frequencies used in the second frequency search. The executing of the third frequency search may include: selecting a frequency for detailed search in the third frequency search using the search frequency pattern with the search frequency, which is acquired by the second frequency search and at which the correlation value is a maximum, as the reference frequency; executing a detailed frequency search of performing the correlation operation at each frequency for detailed search; and repeating selection of the frequency for detailed search and the detailed frequency search using a frequency for detailed search, which is acquired by the detailed frequency search and at which the correlation value is a maximum, as the new reference frequency.

According to the seventh aspect of the invention, the frequency, which is selected using a search frequency pattern on the basis of a predetermined reference frequency, and the frequency for a side lobe check are selected as search frequencies used in the second frequency search. A frequency for detailed search is selected using the search frequency pattern with the search frequency, which is acquired by the second frequency search and at which the correlation value is a maximum, as the reference frequency, and a detailed frequency search is executed at each frequency for detailed search. The selection of the frequency for detailed search and the detailed frequency search are repeated using the frequency for detailed search, which is acquired by the detailed frequency search and at which the correlation value is a maximum, as a new reference frequency. The accuracy and the efficiency of a frequency search are improved by narrowing a distance between frequencies while repeating the selection of a frequency for detailed search and a detailed frequency search.

BRIEF DESCRIPTION OF THE DRAWINGS

The invention will be described with reference to the accompanying drawings, wherein like numbers reference like elements.

FIG. 4 is a view showing an example of the data configuration of first type frequency pattern data.

FIG. 5 is a view showing an example of the data configuration of second type frequency pattern data.

FIG. 14 is a view showing an example of the data configuration of second type frequency pattern data in a modification.

FIG. 15 is a view showing an example of the data configuration of second type frequency pattern data in a modification.

DESCRIPTION OF EXEMPLARY EMBODIMENTS

Figure 1:
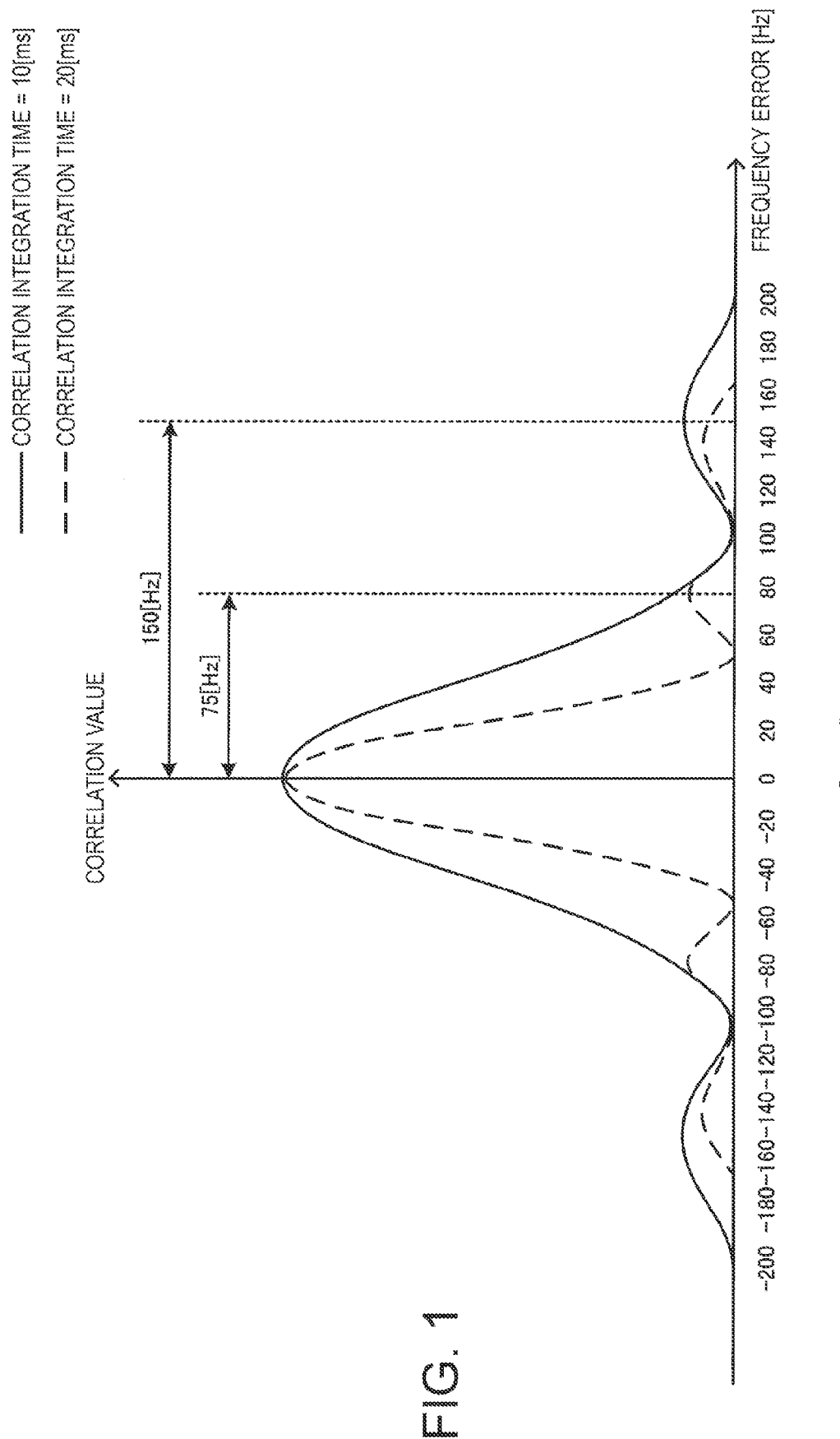
FIG. 1 is a view showing an example of a frequency change of the correlation value.

Preferred embodiments of the invention will be described with reference to the accompanying drawings. The case will be described in which the invention is applied to a GPS receiver that receives a GPS satellite signal transmitted from a GPS (Global Positioning System) satellite. Embodiments to which the invention can be applied are not limited to the following embodiments.

1. Principles

First, principles of capture frequency decision in the present embodiment will be described.

The GPS satellite is a kind of positioning satellite. Four or more GPS satellites are disposed on each of six orbital surfaces of the earth and are operated such that four or more satellites can always be observed under geometric arrangement from anywhere on the earth.

The GPS satellite transmits a GPS satellite signal including navigation messages, such as an almanac or an ephemeris. The GPS satellite signal is a communication signal with a frequency of 1.57542 [GHz] that is modulated according to a CDMA (Code Division Multiple Access) method, which is known as a spread spectrum method, using a PRN (pseudo random noise) code which is a kind of spread code. The PRN code is a pseudo random noise code, which has a code length of 1023 chips as 1 PN frame and has a repetition period of 1 ms, and is different for every satellite.

A GPS receiver specifies (captures) phase and frequency of a GPS satellite signal by performing a correlation operation for calculating and integrating the correlation between a PRN code carried by the received signal and a replica code stored and/or generated by the receiver. The correlation operation may, for example, be performed using an FFT (Fast Fourier Transform) operation. The GPS receiver performs this correlation operation for each of the phase direction and the frequency direction.

In the correlation operation, the peak of a correlation value is made noticeable easily by integrating the correlation value for a predetermined time (e.g., selected period of time). In particular, in the environment where a received GPS satellite signal becomes a weak signal, such as an indoor environment, a clear difference does not appear in the correlation value. As a result, it may not be easy to detect the peak of the correlation value. In the present embodiment, a time period for which the correlation value is integrated in the correlation operation is called a "correlation integration time". The time period may have a selectable duration, such as 10 milliseconds, 20 milliseconds, etc.

In the correlation operation, the correlation value becomes a maximum when the frequency of a signal generated by a replica code matches the frequency of a received signal. More specifically, if the relationship between the frequency of a signal generated by a replica code and the correlation value calculated (e.g., generated) in the correlation operation is plotted in a graph, the characteristics can be seen in which the correlation value is a maximum at a certain frequency and the correlation value decreases as it becomes distant from the frequency. It is known that, ideally, a frequency change of the correlation value can be approximated using a "Sinc function" (function obtained by dividing a sine function by a variable of the sine function), or more specifically a squared Sinc function (which is the square output value of the Sinc function).

FIG. 1 shows an example of a processing result of correlation operation. Here, a frequency change of the correlation value when performing correlation operation with a correlation integration time set to "10 milliseconds" and "20 milliseconds" is shown. The horizontal axis indicates a difference (frequency error) between the true value of a frequency of a received signal and a frequency of a signal generated by a replica code, and the vertical axis indicates a correlation value.

Referring to FIG. 1, it can be seen that the frequency change of the correlation value can be approximated in the shape of a squared Sinc function. In both the cases where the correlation integration time is 10 ms and 20 ms, a main lobe is formed in which the correlation value is a maximum when a frequency error is "0". The correlation value decreases as the frequency error becomes distant from "0", but a side lobe in which the correlation value increases again at a certain frequency is formed. A plurality of side lobes may be present. In the present embodiment, a side lobe nearest to the main lobe is called a "first side lobe". Since side lobes appear symmetrically with respect to the main lobe, both side lobes adjacent to left and right sides of the main lobe are first side lobes. Thus, the correlation operation generates a correlation value that varies in a sinusoidal manner with respect to the frequency error, with the correlation value having a main lobe of maximum value at zero frequency error, and one or more side lobes of lesser value on either side of the main lobe at non-zero values of frequency error.

The frequency difference between the center frequency of the main lobe and the center frequency of the first side lobe (main/side frequency difference) changes with a correlation integration time. In FIG. 1, the main/side frequency difference is about 150 [Hz] when the correlation integration time is 10 milliseconds, and the main/side frequency difference is about 75 [Hz] when the correlation integration time is 20 milliseconds.

Although not shown in FIG. 1, the inventor of this application conducted an experiment of checking the frequency change of the correlation value similarly for other correlation integration times. On the basis of these experimental results, the main/side frequency difference "Δf" was approximated by the following expression (1) in the present embodiment.

$$\Delta f \text{ [Hz]} = 1000 \text{ [msec]} / t \text{ [msec]} \times 1.5 \quad (1)$$

Here, "t" is a correlation integration time.

In the present embodiment, it is one of the features to narrow a distance between frequencies efficiently using the main/side frequency difference "Δf" calculated according to the expression (1). Specifically, a capture frequency is decided by narrowing the distance between frequencies using different methods according to the receiving environment of a GPS receiver.

In the present embodiment, two electric field environments according to the signal strength are assumed to be the receiving environment. Specifically, the two electric field environments are first and second electric field environments. Here, the environment where the received GPS satellite signal becomes a weak signal is assumed to be the first electric field environment, and the environment where a strong signal can be received compared with the first electric field environment is assumed to be the second electric field environment.

In the present embodiment, a first type correlation operation and a second type correlation operation are performed as correlation operations. In each of the correlation operations, an integration time of the correlation value is individually set to perform a correlation operation. Hereinbelow, the correlation integration time in the first type correlation operation will be described as a "first type correlation integration time", and the correlation integration time in the second type correlation operation will be described as a "second type correlation integration time".

The correlation integration time may be set on the basis of the signal strength of a received signal or the angle of elevation of a GPS satellite to be captured (satellite to be captured), for example. For example, when the signal strength of a received signal is small, it becomes easy to determine the peak of the correlation value as a time for which the correlation value is integrated increases. Accordingly, the correlation integration time should be set to be long. On the other hand, when the signal strength of a received signal is large, it is easy to determine the peak of the correlation value even if the correlation integration time is short. Accordingly, the correlation integration time may be set to be short. For this reason, it is appropriate to set the correlation integration time to be long as the signal strength of a received signal decreases.

When the angle of elevation of a satellite to be captured is large, the received signal is a strong signal in many cases. When the angle of elevation of a satellite to be captured is small, it is not a strong signal in many cases. Accordingly, it is appropriate to set the correlation integration time to be long as the angle of elevation of a satellite to be captured decreases.

(1) Decision of a Capture Frequency in the First Electric Field Environment

Figure 2:
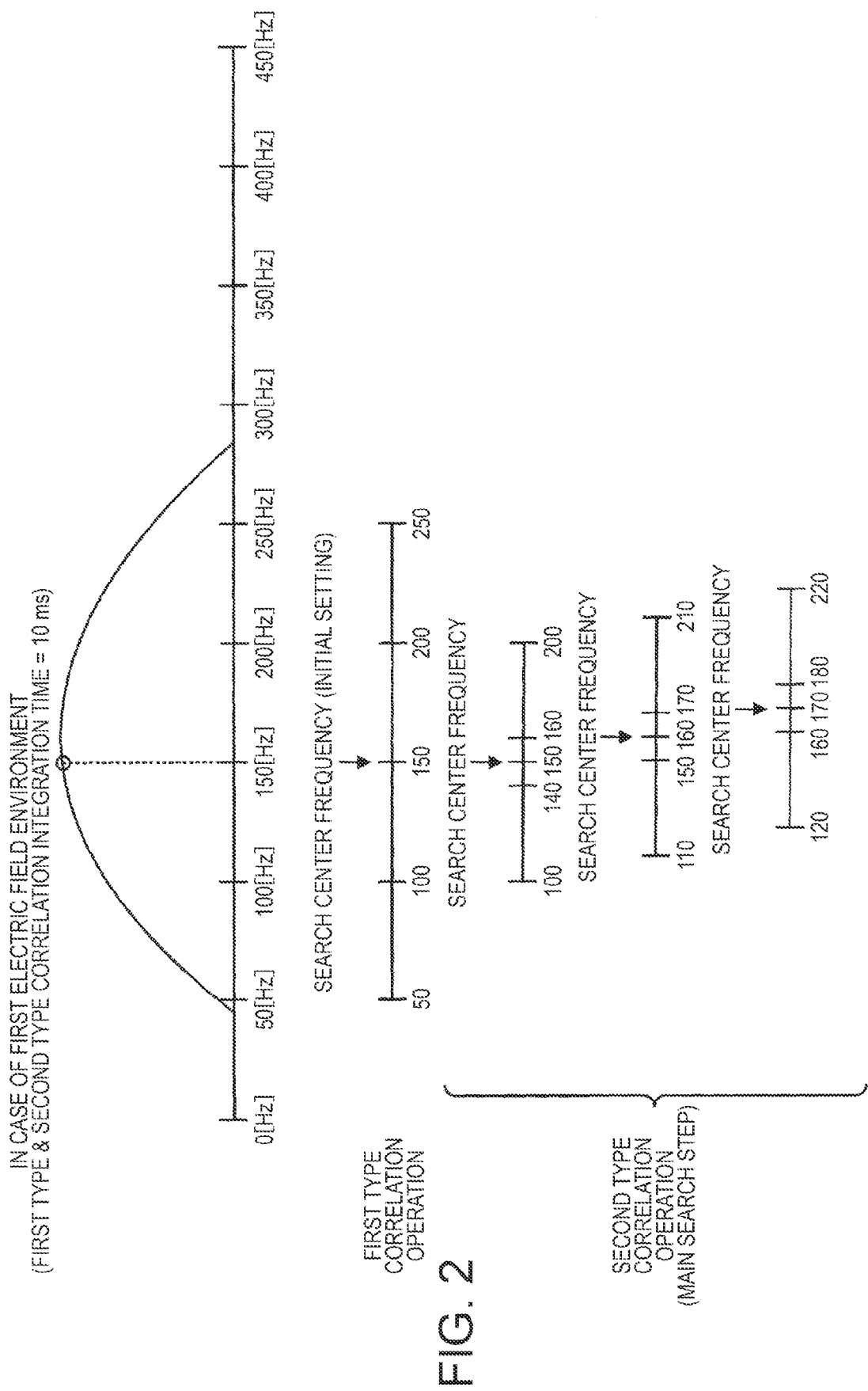
FIG. 2 is an explanatory view of the principle of capture frequency decision in the first electric field environment.

FIG. 2 is a view for explaining the principle of the capture frequency decision in the first electric field environment. Here, the case where a correlation operation is performed with the first and second type correlation integration time as "10 milliseconds" will be described as an example. The uppermost graph shows an example of a correlation value change in the frequency direction when performing a correlation operation on a certain received signal. The frequency of the horizontal axis indicates a search frequency. Although the graph of correlation value change is shown and described in advance, it is still in a state where the correlation value is not calculated in the decision of a capture frequency.

The frequency used when actually capturing a satellite signal using the decided capture frequency is a frequency obtained by adding the capture frequency to a frequency (e.g., intermediate frequency) which is obtained by down conversion of a carrier frequency. Since the intermediate frequency is constant, it is not necessary to take the intermediate frequency into consideration each time. In the present embodiment, therefore, frequencies (a search center frequency, a search frequency, a capture frequency) used in the first and second type correlation operations as a frequency search are defined as frequency differences with respect to the intermediate frequency (frequency errors with respect to the intermediate frequency). Undoubtedly, a frequency used in a frequency search may be defined as a frequency obtained by addition of the intermediate frequency to such a difference frequency, and such frequency may also be used when actually capturing a satellite signal.

In this state, a frequency (search center frequency) as a reference of a frequency search is initialized first. For example, it may be set as a Doppler frequency which is calculated from the track information or the traveling speed of a GPS satellite, which is to be captured, for a carrier frequency of a GPS satellite signal. Here, the search center frequency is set to 150 [Hz]. Then, a search frequency used in the first type correlation operation is selected using the search center frequency and a first type frequency pattern set beforehand.

FIG. 4 shows an example of the data configuration of first type frequency pattern data 253. In the first type frequency pattern data 253, a frequency pattern is set every first type correlation integration time. For example, the frequency pattern is set as a symmetrical pattern with the search center frequency in the middle. Preferably, adjacent frequencies of the first type frequency pattern are spaced from one another by substantially the same distance (e.g., equal-distance spacing of frequencies).

For example, for the case where the first type correlation integration time is "10 milliseconds", patterns of five frequencies of {fp−100 [Hz], fp−50 [Hz], fp [Hz], fp+50 [Hz], and fp+100 [Hz]} are set with the pattern center frequency "fp" in the middle. For the case where the first type correlation integration time is "20 milliseconds", patterns of five frequencies of {fp−50 [Hz], fp−25 [Hz], fp [Hz], fp+25 [Hz], and fp+50 [Hz]} are set.

The frequency patterns are set such that a search frequency gap decreases as the correlation integration time increases. This is because a change of the correlation value in the frequency direction (difference of the correlation value at each frequency) becomes noticeable as the correlation integration time increases, and accordingly, the frequency search becomes easy. That is, since it becomes easy to determine the peak of a correlation value as the correlation integration time increases, frequency search can be minutely performed. Accordingly, the search is performed with the small frequency search width.

Returning to the explanation regarding FIG. 2, a search frequency is selected by applying a frequency pattern, which is set in the first type frequency pattern data 253 in FIG. 4, to the initial value of the search center frequency. In FIG. 2, since the initial value of the search center frequency is set to 150 [Hz] and the first type correlation integration time is set to "10 milliseconds", five frequencies of {50 [Hz], 100 [Hz], 150 [Hz], 200 [Hz], and 250 [Hz]} are selected as search frequencies.

After the search frequency is selected, the first type correlation operation is performed for each selected search frequency. Specifically, a correlation operation between a received signal and a signal generated by a replica code is performed for each of the above-described five search frequencies, and a search frequency at which the correlation value becomes a maximum is determined. In the example shown in FIG. 2, the correlation value is a maximum at the search frequency of 150 [Hz]. The search frequency at which the correlation value becomes a maximum is set as a search center frequency and the second type correlation operation is performed.

In the second type correlation operation, a detailed frequency search is performed while shifting the search center frequency little by little. A step of performing the detailed search may also be said to be a "main search step" for deciding a capture frequency. This main search step is a step of repeating the selection of frequencies for detailed search according to a second type frequency pattern, which is set beforehand, and a correlation operation at each frequency for detailed search while shifting the search center frequency.

FIG. 5 shows an example of the data configuration of second type frequency pattern data 255. The second type frequency pattern data 255 is data in which a frequency pattern is set every second type correlation integration time in each of the first electric field environment and the second electric field environment. Similar to the first type frequency pattern data 253 shown in FIG. 4, a symmetrical pattern with the search center frequency in the middle is set. In preferred implementations, the two closest frequencies on either side of the pattern's center frequency fp are spaced from fp by a first frequency difference; the next two closest frequencies on either side of fp are spaced from fp by a second frequency difference; wherein the second spacing distance is greater than twice the first spacing distance. The second spacing distance may be three to five times the spacing distance or more. That is to say, adjacent frequencies of the second type frequency pattern may be spaced from one another by different distances. The use of different spacing distances provides the advantage of making fine refinements while allowing for large changes in the search when large changes in satellite movements occur, or which large noise sources cause unexpected variations.

In the first electric field environment, for the case where the second type correlation integration time is "10 milliseconds", patterns of five frequencies of {fp−50 [Hz], fp−10 [Hz], fp [Hz], fp+10 [Hz], and fp+50 [Hz]} are set. For the case where the second type correlation integration time is "20 milliseconds", patterns of five frequencies of {fp−25 [Hz], fp−5 [Hz], fp [Hz], fp+5 [Hz], and fp+25 [Hz]} are set.

In the main search step, according to the second type frequency pattern described above, frequencies for detailed search when the search center frequency are set in the middle are selected and the correlation operation is performed at each frequency for detailed search. The selection of frequencies for detailed search and the correlation operation are repeated using a frequency for detailed search corresponding to the largest correlation value as a new search center frequency, and a frequency for detailed search at which the correlation value becomes a maximum is finally determined as a capture frequency.

For example, in FIG. 2, 150 [Hz] at which the correlation value is a maximum in the first type correlation operation is set as a search center frequency, and five frequencies of {100 [Hz], 140 [Hz], 150 [Hz], 160 [Hz], and 200 [Hz]} are selected as frequencies for detailed search by applying the second type frequency pattern. The correlation value is calculated (e.g., generated) by performing the correlation operation at each frequency for detailed search.

As a result, for example, if the correlation value becomes a maximum at 160 [Hz], the search center frequency is set to 160 [Hz] by shifting it by 10 [Hz], and five frequencies of {110 [Hz], 150 [Hz], 160 [Hz], 170 [Hz], and 210 [Hz]} are selected as frequencies for detailed search by applying the second type frequency pattern again. The correlation value is calculated (e.g., generated) by performing the correlation operation at each frequency for detailed search. Subsequently, the selection of a frequency for detailed search and the correlation operation are repeated in the same manner as described above, and a frequency for detailed search at which the correlation value becomes a maximum is finally determined as a capture frequency.

(2) Decision of a Capture Frequency in the Second Electric Field Environment

Figure 3:
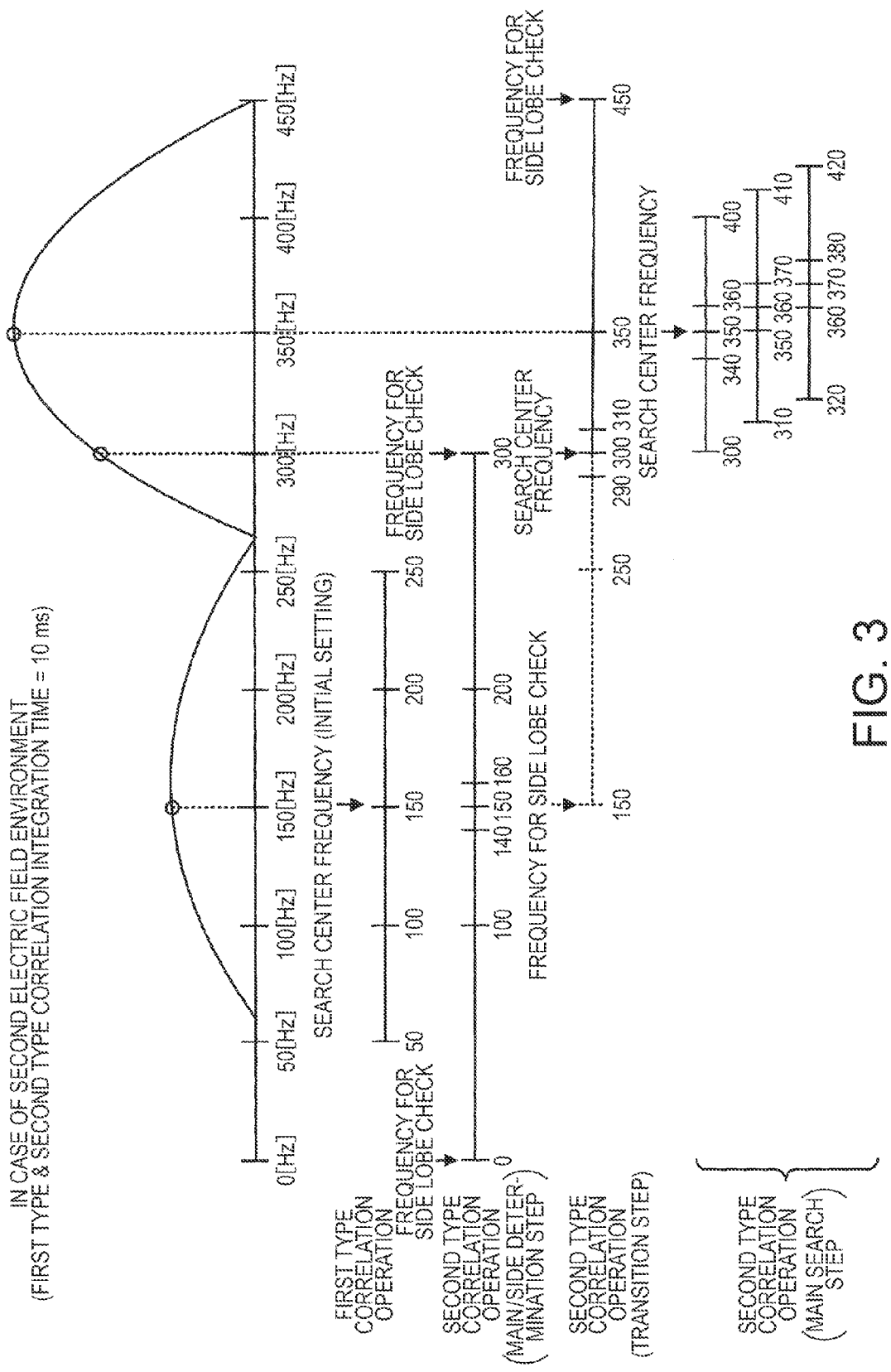
FIG. 3 is an explanatory view of the principle of capture frequency decision in the second electric field environment.

FIG. 3 is a view for explaining the principle of capture frequency decision in the second electric field environment. Similar to FIG. 2, the case where a correlation operation is performed with the first and second type correlation integration time as "10 milliseconds" will be described as an example. Similar to FIG. 2, the uppermost graph shows an example of a correlation value change in the frequency direction when performing a correlation operation on a certain received signal.

The flow until the first type correlation operation ends is the same as that shown in FIG. 2. That is, a correlation operation between a received signal and a signal generated by a replica code is performed for each of the five search frequencies selected. The first type correlation operation is a step of searching for a frequency roughly and is equivalent to the first frequency search.

Then, a search frequency at which the correlation value becomes a maximum in the first type correlation operation is determined, and the search frequency is set as a search center frequency. According to the set search center frequency and the second type frequency pattern, a search frequency which is first used in the second type correlation operation is selected.

Referring to the second type frequency pattern data 255 shown in FIG. 5, in the second electric field environment, patterns of seven frequencies of {fp−Δf [Hz], fp−50 [Hz], fp−10 [Hz], fp [Hz], fp+10 [Hz], fp+50 [Hz], and fp+Δf [Hz]} are set for the case where the second type correlation integration time is "10 milliseconds". For the case where the second type correlation integration time is "20 milliseconds", patterns of seven frequencies of {fp−Δf [Hz], fp−25 [Hz], fp−5 [Hz], fp [Hz], fp+5 [Hz], fp+25 [Hz], and fp+Δf [Hz]} are set.

"Δf" is a main/side frequency difference calculated (e.g., determined) according to the expression (1). The frequency pattern is set such that a frequency, which is distant by the main/side frequency difference "Δf" from the search center frequency, is selected as a search frequency. In the following explanation, a frequency obtained by adding/subtracting the main/side frequency difference to/from the search center frequency is called a "frequency for a side lobe check". In the present embodiment, it is one of the features to check (a side lobe check) whether or not the search center frequency, which is currently set, is a frequency of a side lobe portion using the frequency for a side lobe check.

According to the expression (1), the main/side frequency difference "Δf" is calculated using a correlation integration time "t". In the present embodiment, there are first and second type correlation integration times as the correlation integration time, and the main/side frequency difference "Δf" is calculated using the first type correlation integration time of the two types of this correlation integration time. The reason is that since detailed frequency search is performed in the second type correlation operation using a frequency, at which the correlation value becomes a maximum in the first type correlation operation, as a reference frequency (search center frequency), a side lobe check cannot be appropriately performed unless the frequency for a side lobe check based on the correlation integration time used in the first type correlation operation is set.

In FIG. 3, since the first type correlation integration time is "10 milliseconds", the main/side frequency difference Δf is calculated as 150 [Hz] from the expression (1). In this case, if the second type frequency pattern is applied to the search center frequency of 150 [Hz] which is a reference frequency, seven frequencies of {0 [Hz], 100 [Hz], 140 [Hz], 150 [Hz], 160 [Hz], 200 [Hz], and 300 [Hz]} are selected as search frequencies. In this case, 0 [Hz] and 300 [Hz], which are frequencies obtained by adding and subtracting the main/side frequency difference Δf=150 [Hz] to and from the search center frequency of 150 [Hz], are set as frequencies for a side lobe check.

Then, the search frequency at which the correlation value becomes a maximum is determined by performing the correlation operation at the seven search frequencies. If the search frequency at which the correlation value becomes a maximum is a frequency for a side lobe check, the search center frequency is determined to be a frequency of a side lobe portion and continues a side lobe check. In this case, the search center frequency is updated to the frequency for a side lobe check at which the correlation value becomes a maximum, and search frequencies are selected again. This step is called a "main/side determination step" in the present embodiment.

Referring to FIG. 3, in the main/side determination step, the search frequency at which the correlation value becomes a maximum by the correlation operation is 300 [Hz] which is a frequency for a side lobe check. Accordingly, the search center frequency is updated to 300 [Hz] which is a frequency for a side lobe check at which the correlation value becomes a maximum, and the second type frequency pattern is applied again to newly select a search frequency.

If the second type frequency pattern is applied to the new search center frequency of 300 [Hz], seven frequencies of {150 [Hz], 250 [Hz], 290 [Hz], 300 [Hz], 310 [Hz], 350 [Hz], and 450 [Hz]} are selected as search frequencies. In this case, 150 [Hz] and 450 [Hz], which are frequencies obtained by adding and subtracting the main/side frequency difference Δf=150 [Hz] to and from the search center frequency of 300 [Hz], are set as frequencies for a side lobe check.

Although the correlation operation may be performed for each of the seven search frequencies, the correlation operation may be omitted for one of the frequencies for a side lobe check on the left and right sides viewed from the search center frequency in order to reduce the processing load by reducing the amount of computation. In the case shown in FIG. 3, for left direction frequencies (frequencies lower than the search center frequency) viewed from the search center frequency, it is confirmed that the calculation has already been completed through the first correlation operation and the main/side determination step of the second correlation operation and the main lobe does not exist in the direction. Therefore, it is proper to perform calculation only for right direction search frequencies (frequencies higher than the search center frequency) viewed from the search center frequency.

In the opposite case to the case shown in FIG. 3, when calculation regarding right direction frequencies (frequencies higher than the search center frequency) viewed from the search center frequency has been completed through the first correlation operation and the main/side determination step of the second correlation operation, the calculation may be performed only for left direction search frequencies (frequencies lower than the search center frequency) viewed from the search center frequency.

If the correlation operation is performed at each search frequency, the maximum correlation value can be obtained at a search frequency of 350 [Hz]. 350 [Hz] is not a frequency for a side lobe check. Since it is a frequency of a main lobe portion, the side lobe check is ended here. This step is a step in which the search center frequency shifts from the frequency of the side lobe portion to the frequency of the main lobe portion. In the present embodiment, this step is called a "transition step". The "main/side determination step" and the "transition step" are steps of performing a correlation operation at each search frequency selected on the basis of a result of the first type correlation operation as the first frequency search, and are equivalent to the second frequency search.

After processing of the transition step ends, the search center frequency is updated to 350 [Hz] which is a search frequency at which the correlation value becomes a maximum. The process proceeds to the "main search step" using the updated search center frequency. The flow of the processing in the main search step is the same as that in the main search step under the first electric field environment described in FIG. 2. That is, a capture frequency is decided by repeating the selection of a frequency for detailed search and the correlation operation using the search center frequency of 350 [Hz] as a reference. The "main search step" is a step of searching for a frequency in detail using the results of the main/side determination step and the transition step as the second frequency search, and is equivalent to a third frequency search.

2. Functional Configuration

Figure 6:
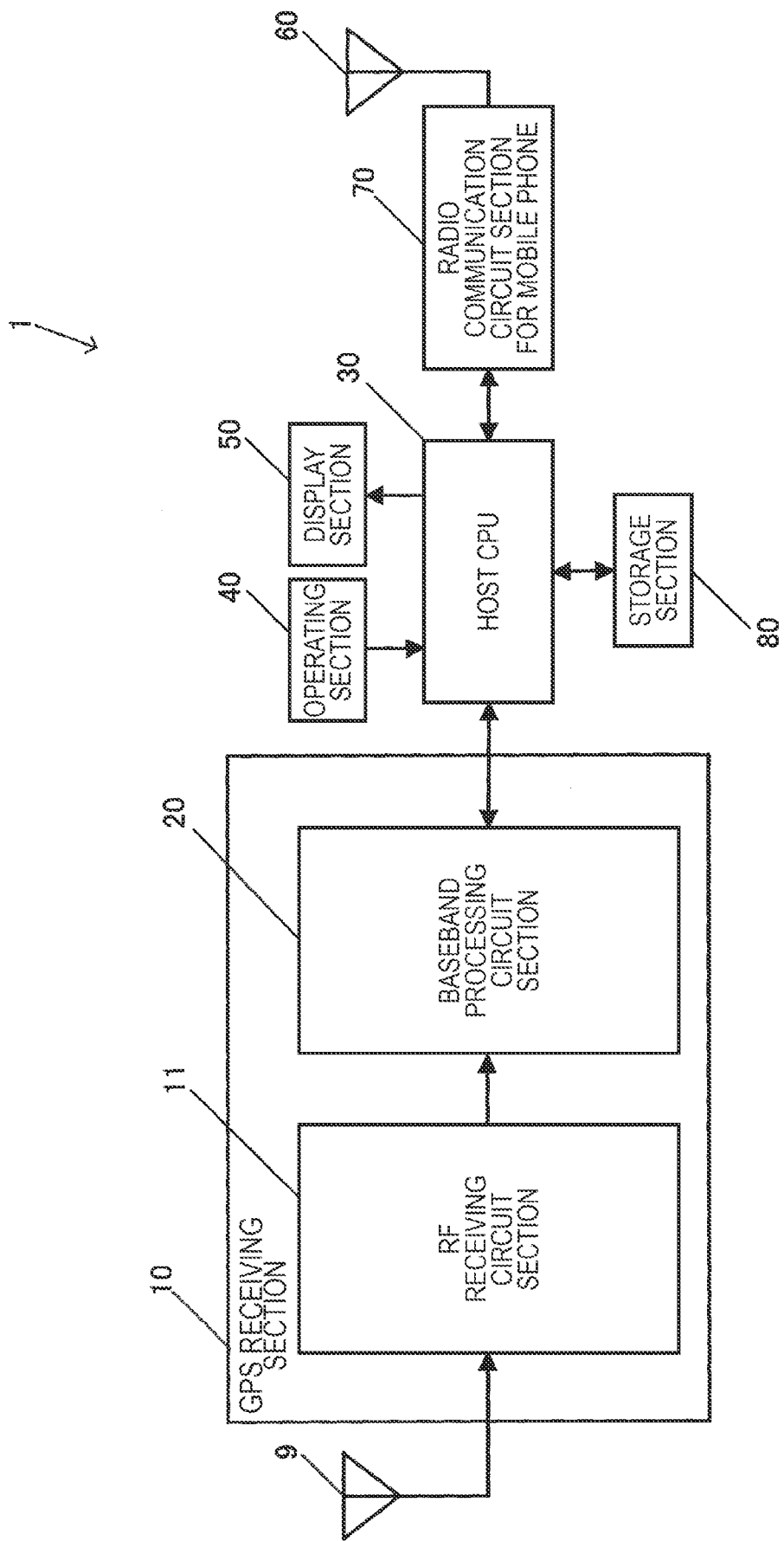
FIG. 6 is a block diagram showing the functional configuration of a mobile phone.

FIG. 6 is a block diagram showing the functional configuration of a mobile phone 1 which is an example of an electronic apparatus having a GPS receiver built therein. The mobile phone 1 includes a GPS antenna 9, a GPS receiving section 10, a host CPU (Central Processing Unit) 30, an operating section 40, a display section 50, a mobile phone antenna 60, a radio communication circuit section 70 for a mobile phone, and a storage section 80.

The GPS antenna 9 is an antenna that receives an RF (Radio Frequency) signal including a GPS satellite signal transmitted from a GPS satellite, and outputs the received signal to the GPS receiving section 10.

The GPS receiving section 10 is a position calculating circuit which measures the position of the mobile phone 1 on the basis of a signal output from the GPS antenna 9, and is also a functional block equivalent to the GPS receiver. The GPS receiving section 10 includes an RF (Radio Frequency) receiving circuit section 11 and a baseband processing circuit section 20. The RF receiving circuit section 11 and the baseband processing circuit section 20 may be manufactured as separate LSIs (large scale integration) or may be manufactured as one chip.

The RF receiving circuit section 11 is a circuit block for RF signal processing, and generates an oscillation signal for RF signal multiplication by frequency dividing or multiplying a predetermined oscillation signal. The RF signal is down-converted into a signal with an intermediate frequency (IF (intermediate frequency) signal) by multiplying the RF signal output from the GPS antenna 9 by the generated oscillation signal, and the IF signal is amplified. Then, the IF signal is converted into a digital signal by an A/D converter and is then output to the baseband processing circuit section 20.

The baseband processing circuit section 20 is a circuit section that captures and extracts a GPS satellite signal by performing a correlation operation and the like on the IF signal output from the RF receiving circuit section 11 and that acquires a navigation message, time information, and the like by decoding the data. The baseband processing circuit section 20 decides a capture frequency of the GPS satellite signal by performing frequency searching on the signal in an intermediate frequency band output from the RF receiving circuit section 11. In this case, the circuit may be designed to acquire a frequency difference (frequency error) from the intermediate frequency of a carrier as a capture frequency or may be designed to acquire a frequency, which is obtained by adding the frequency difference (frequency error) to the intermediate frequency of the carrier, as a capture frequency.

Figure 7:
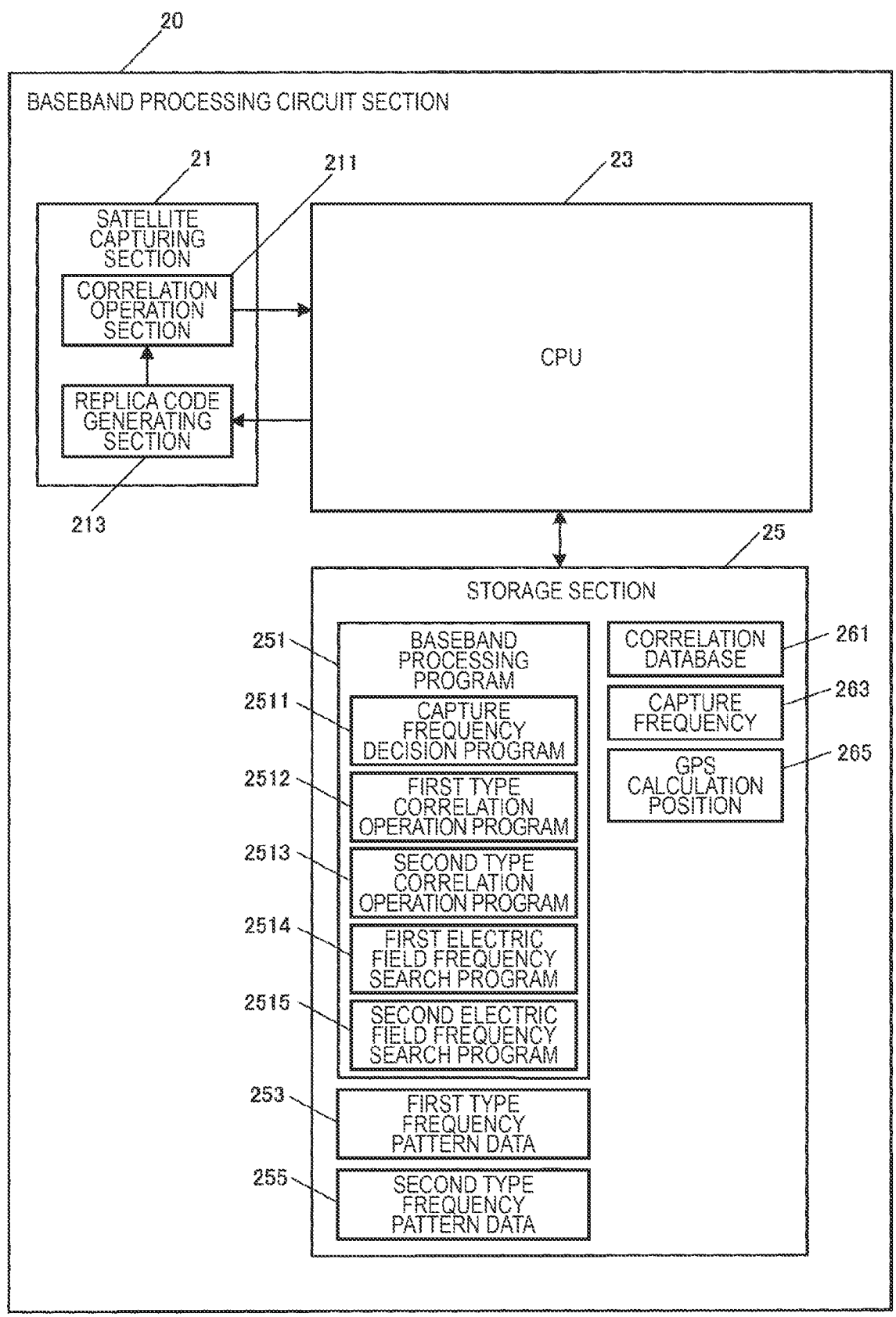
FIG. 7 is a view showing the circuit configuration of a baseband processing circuit section.

FIG. 7 shows an example of the circuit configuration of the baseband processing circuit section 20. The baseband processing circuit section 20 includes a satellite capturing section 21, a CPU 23, and a storage section 25. Storage section 25 comprises a tangible, non-transitory, computer readable medium, and various programs (e.g., codes) that direct CPU 23 to perform various actions may be embodied on the medium. The satellite capturing section 21 is a circuit section that captures a GPS satellite signal from the received signal (IF signal), which is output from the RF receiving circuit section 11, and includes a correlation operation section 211 and a replica code generating section 213.

The correlation operation section 211 captures a GPS satellite signal by performing a correlation operation for calculating the correlation between the PRN code included in the received signal and the replica code generated by the replica code generating section 213. If a GPS satellite signal to be captured is correct, the replica code and the PRN code included in the GPS satellite signal will match each other (capture success). If it is wrong, the replica code and the PRN code included in the GPS satellite signal will not match each other (capture failure). Accordingly, it can be determined whether or not capturing of a GPS satellite signal has succeeded by determining the peak of the calculated (e.g., generated) correlation value. Thus, the GPS satellite signal can be captured by performing a correlation operation with the same received signal while sequentially changing the replica code.

The process returns to FIG. 6. The host CPU 30 is a processor which performs overall control of the sections of the mobile phone 1 according to a program, such as a system program, stored in the storage section 80. The host CPU 30 performs processing for displaying the position information input from the baseband processing circuit section 20 on the display section 50 or performs various kinds of application processes using the position information.

The operating section 40 is an input device configured to include a touch panel or a button switch, for example, and outputs a signal corresponding to a pressed key or button to the host CPU 30. By the operation of the operating section 40, instructions, such as a call request, a mail transmission or reception request, and a position calculation request, are input.

The display section 50 is a display device formed by using an LCD (Liquid Crystal Display), for example, and performs display on the basis of a display signal input from the host CPU 30. A position display screen, time information, and the like are displayed on the display section 50.

The mobile phone antenna 60 is an antenna used to perform transmission and reception of a radio signal for mobile phones between the mobile phone 1 and a radio base station provided by a communication service provider of the mobile phone 1.

The radio communication circuit section 70 for a mobile phone is a communication circuit section of a mobile phone configured to include an RF conversion circuit, a baseband processing circuit, and the like and realizes transmission and reception of a call or e-mail by performing modulation, demodulation, and the like of the radio signal for mobile phones.

The storage section 80 is formed by using storage devices, such as a ROM (Read Only Memory) or a flash ROM and a RAM (Random Access Memory), and stores a system program which is used when the host CPU 30 controls the mobile phone 1, programs or data used to realize a position calculating function, and the like. The storage section 80 forms a work area in which the system program executed by the host CPU 30, a processing program, data being processed, a processing result, and the like are temporarily stored.

3. Data Configuration

A baseband processing program 251, which is read by the CPU 23 and is executed as baseband processing (see FIG. 9), the first type frequency pattern data 253, and the second type frequency pattern data 255 are stored in the storage section 25 (see FIG. 7) of the baseband processing circuit section 20. A capture frequency decision program 2511, a first type correlation operation program 2512, a second type correlation operation program 2513, a first electric field frequency search program 2514, and a second electric field frequency search program 2515 are included in the baseband processing program 251 as respective subroutines (e.g., respective codes that direct the CPU 23).

A correlation database 261, a capture frequency 263, and a GPS calculation position 265 are stored in the storage section 25 as the data updated as necessary.

Figure 8:
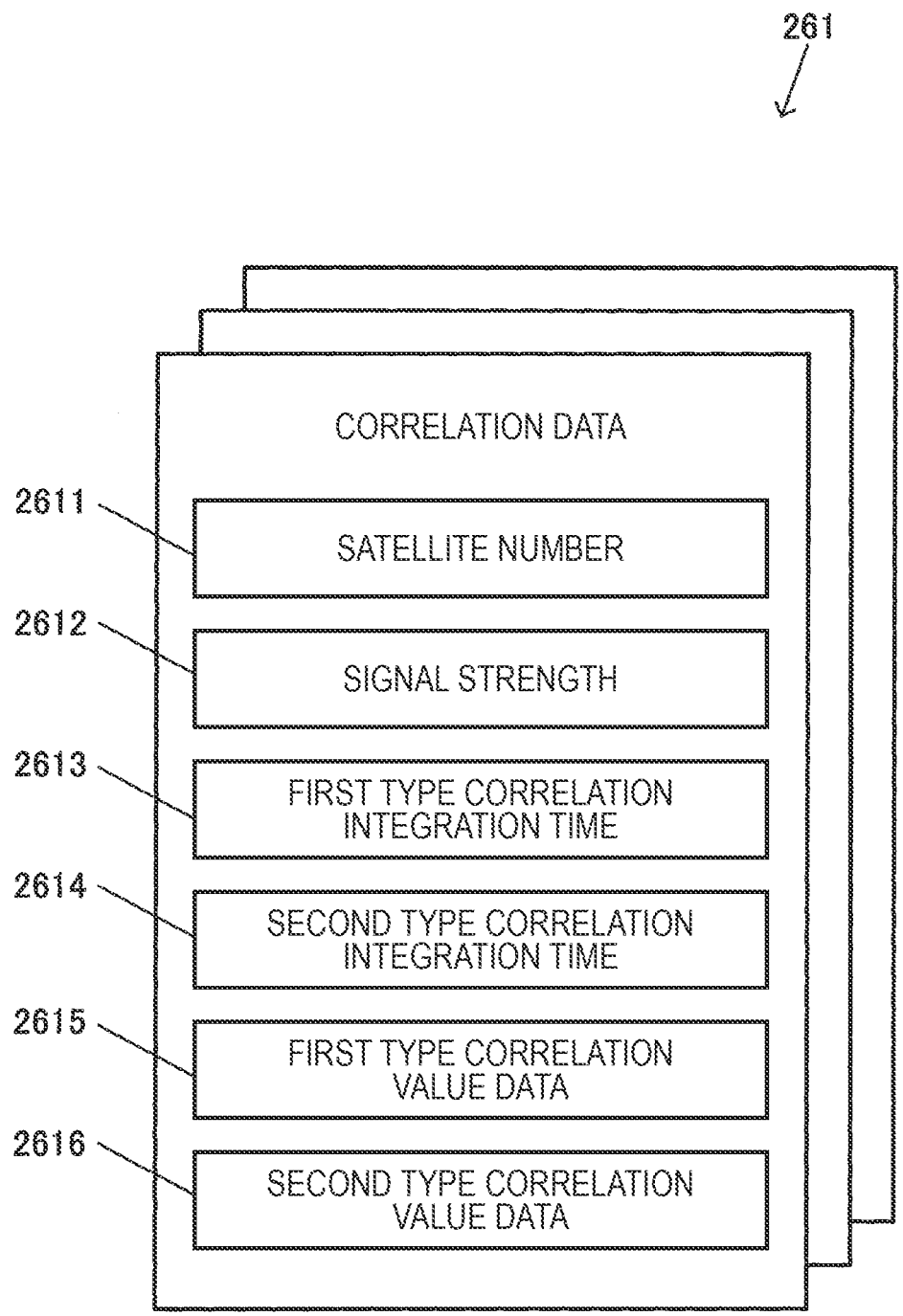
FIG. 8 is a view showing an example of the data configuration of a correlation database.

FIG. 8 shows an example of the data configuration of the correlation database 261. The correlation data is accumulatively stored in the correlation database 261 for each satellite to be captured. A number 2611 of the satellite to be captured, a measured signal strength 2612 of a signal received from the satellite to be captured, a first type correlation integration time 2613, a second type correlation integration time 2614, first type correlation value data 2615, and second type correlation value data 2616 may be stored in the correlation data. The data regarding the correlation value for each frequency obtained by the first type correlation operation may be stored in the first type correlation value data 2615, and the data regarding the correlation value for each frequency obtained by the second type correlation operation may be stored in the second type correlation value data 2616.

4. Flow of Processing

Figure 9:
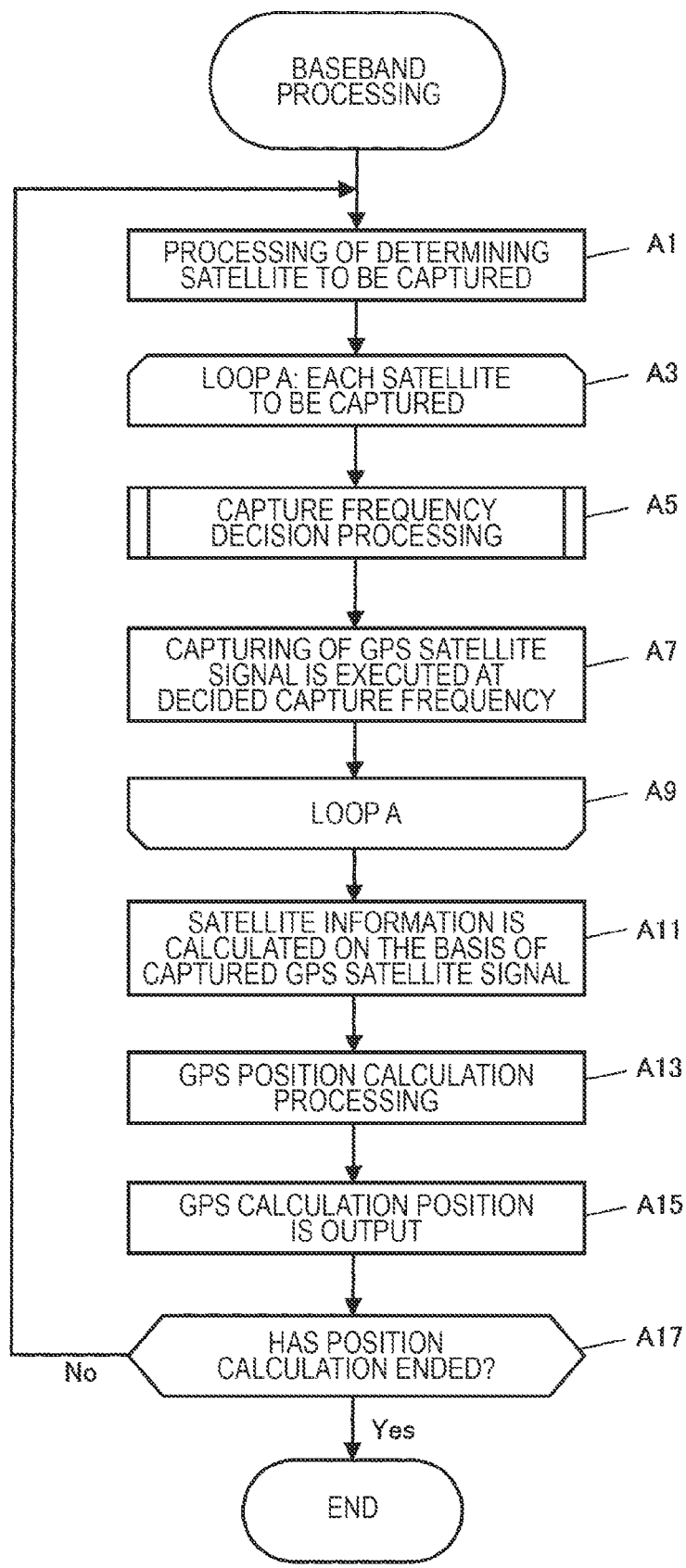
FIG. 9 is a flow chart showing the flow of baseband processing.

FIG. 9 is a flow chart showing the flow of baseband processing executed in the mobile phone 1 when the CPU 23 reads and executes the baseband processing program 251 stored in the storage section 25. Although not particularly described, it is assumed that an RF signal is received through the GPS antenna 9 or down-converted into an IF signal by the RF receiving circuit section 11 and the IF signal is output to the baseband processing circuit section 20 as necessary while the following baseband processing is being executed.

First, the CPU 23 performs processing of determining a satellite to be captured (step A1). Specifically, at a current time measured by a time measuring section (not shown), a GPS satellite located in the sky of a predetermined reference position is determined using the satellite orbit data, such as an almanac or an ephemeris, and is set as a satellite to be captured. In the case of first position calculation after supply of power, a position acquired from the base station of the mobile phone 1 by server assistance may be set as the reference position, for example. In the case of second and subsequent position calculation, the newest GPS calculation position 265 calculated in the previous position calculation may be set as the reference position, for example.

Then, the CPU 23 executes processing of a loop A (steps A3 to A9) for each satellite to be captured which was determined in step A1. In the processing of the loop A, the CPU 23 performs capture frequency decision processing by reading and executing the capture frequency decision program 2511 stored in the storage section 25 (step A5).

Figure 10:
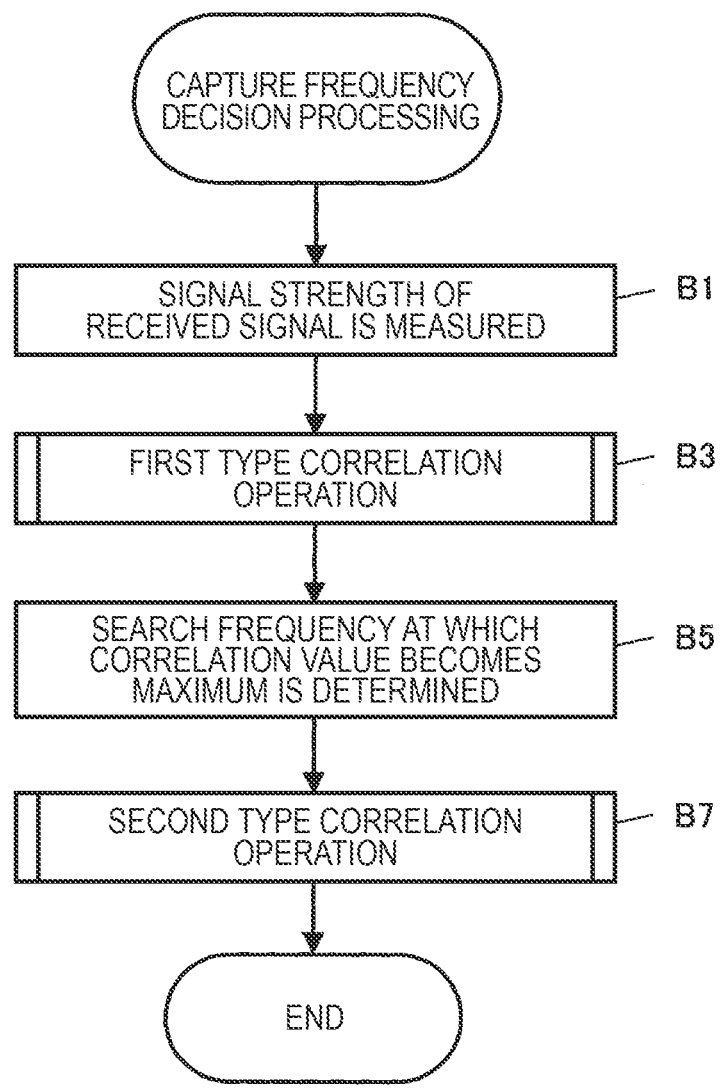
FIG. 10 is a flow chart showing the flow of capture frequency decision processing.

FIG. 10 is a flow chart showing the flow of capture frequency decision processing.

First, the CPU 23 measures the signal strength 2612 of a received signal from the satellite to be captured and stores it and the correlation data, which is matched with the number 2611 of the satellite to be captured, in the correlation database 261 of the storage section 25 (step B1). Then, the CPU 23 performs the first type correlation operation by reading and executing the first type correlation operation program 2512 stored in the storage section 25 (step B3).

Figure 11:
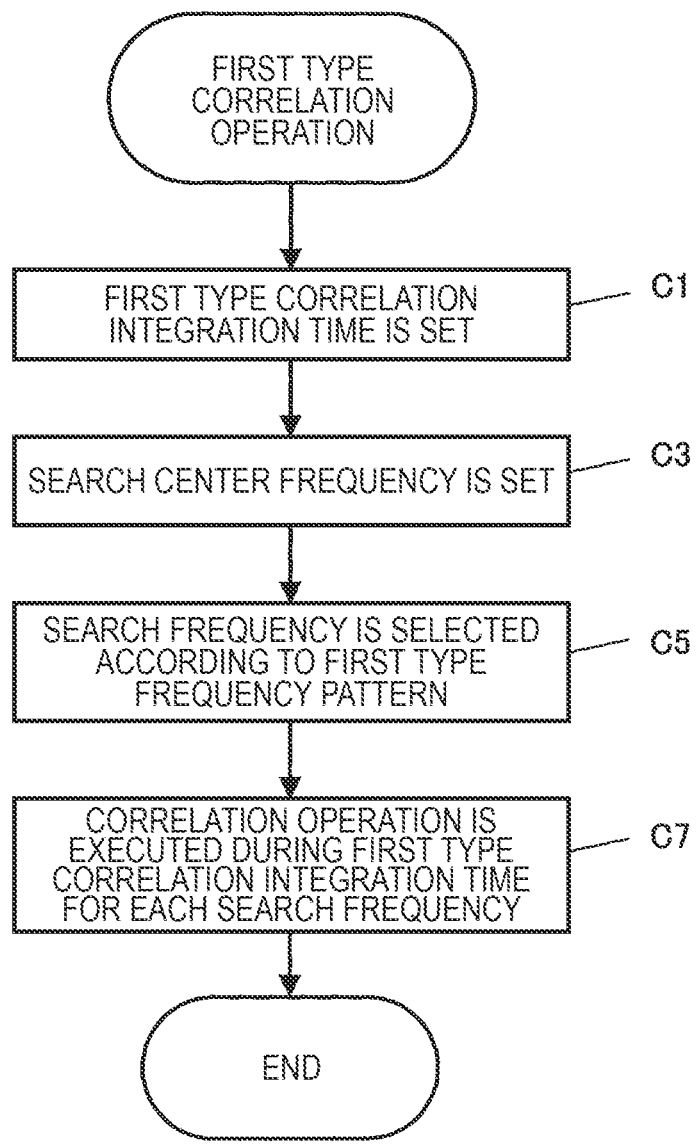
FIG. 11 is a flow chart showing the flow of a first type correlation operation.

FIG. 11 is a flow chart showing the flow of the first type correlation operation.

First, the CPU 23 sets the first type correlation integration time 2613 and stores it in the correlation data of the satellite to be captured of the correlation database 261 (step C1). For example, the first type correlation integration time 2613 may be set on the basis of the signal strength 2612 of a received signal measured in step B1 or the electric field intensity or may be set on the basis of the angle of elevation of the satellite to be captured.

Then, the CPU 23 sets a search center frequency (step C3). In the case of first position calculation after supply of power, a frequency after converting 1.57542 [GHz], which is a carrier frequency of a GPS satellite signal, into an intermediate frequency may be set as the search center frequency, for example. In the case of second and subsequent position calculation, the newest capture frequency 263 decided in the previous step may be set as the search center frequency, for example.

Then, the CPU 23 selects a search frequency according to the first type frequency pattern stored in the first type frequency pattern data 253 of the storage section 25 (step C5). CPU 23 executes a correlation operation during the first type correlation integration time 2613 for each search frequency and stores the acquired correlation value in the first type correlation value data 2615 so as to match the frequency (step C7). Then, the CPU 23 ends the first type correlation operation.

Returning to the capture frequency decision processing shown in FIG. 10, CPU 23 performs the first type correlation operation and then determines a search frequency at which the correlation value becomes a maximum (step B5). Then, the CPU 23 performs the second type correlation operation by reading and executing the second type correlation operation program 2513 stored in the storage section 25 (step B7).

Figure 12:
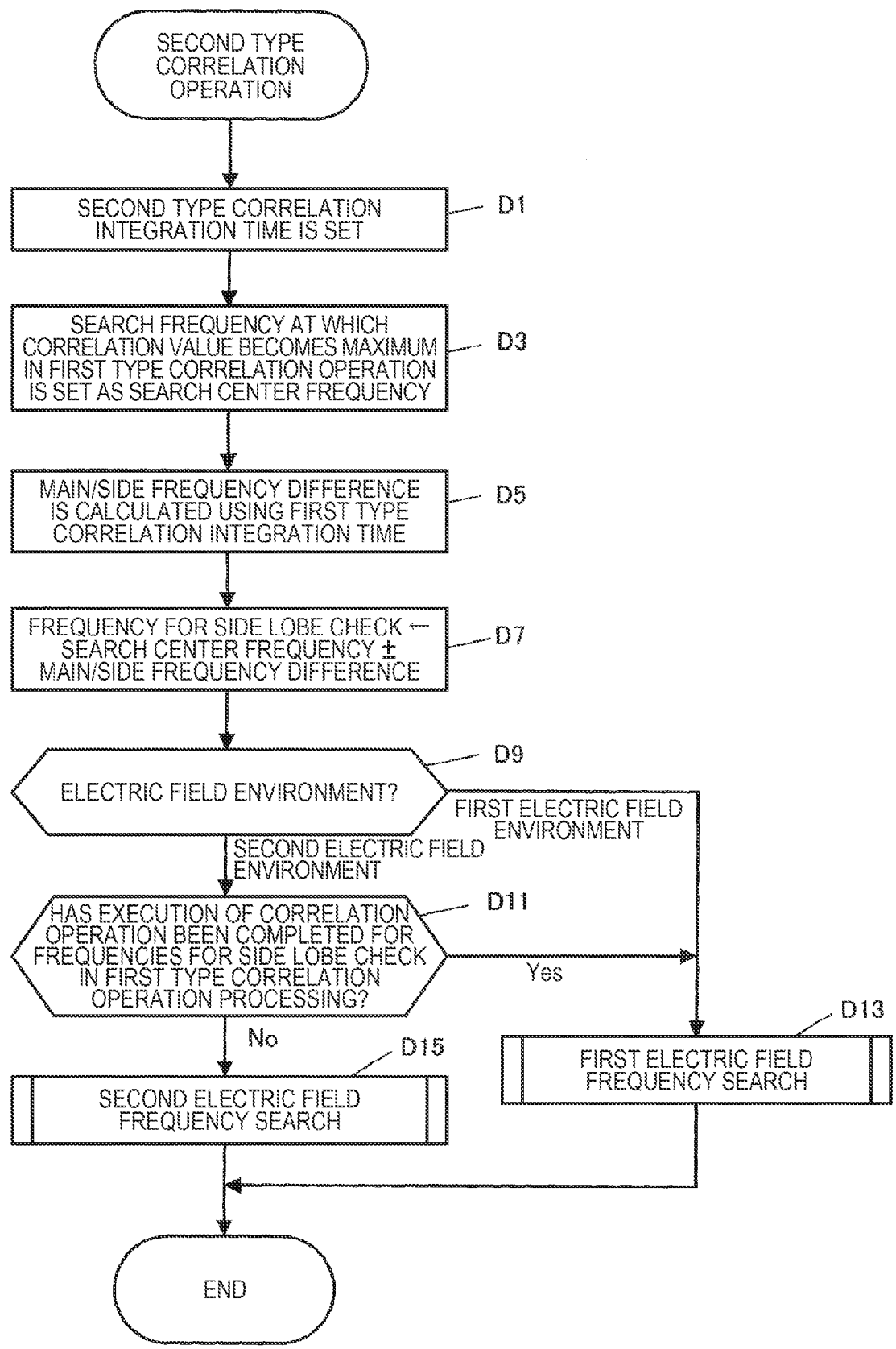
FIG. 12 is a flow chart showing the flow of a second type correlation operation.

FIG. 12 is a flow chart showing the flow of the second type correlation operation.

First, CPU 23 sets the second type correlation integration time 2614 and stores it in the correlation data of the satellite to be captured of the correlation database 261 (step D1). Similar to the first type correlation integration time 2613, the second type correlation integration time 2614 may also be set on the basis of the signal strength 2612 of a received signal measured in step B1 or the electric field intensity or may be set on the basis of the angle of elevation of the satellite to be captured, for example.

Then, CPU 23 sets the search frequency at which the correlation value becomes a maximum in the first type correlation operation, which was determined in step B5, as the search center frequency (step D3). CPU 23 calculates (e.g., generates or determines) the main/side frequency difference "Δf" according to the expression (1) using the first type correlation integration time 2613 (step D5).

Then, CPU 23 sets frequencies, which are obtained by adding and subtracting the main/side frequency difference "Δf" to and from the search center frequency, as frequencies for a side lobe check (step D7). Then, CPU 23 determines the current electric field environment on the basis of the signal strength 2612 of a received signal (step D9). If it is determined that the electric field environment is a second electric field environment (step D9; second electric field environment), the CPU 23 determines whether or not the execution of a correlation operation has been completed for the frequencies for a side lobe check in the first type correlation operation (step D11).

If it is determined that the electric field environment is a first electric field environment in step D9 (step D9; first electric field environment) or if it is determined that the execution of the correlation operation has already been completed for the frequencies for a side lobe check in step D11 (step D11; Yes), CPU 23 performs a first electric field frequency search by reading and executing the first electric field frequency search program 2514 stored in the storage section 25 (step D13).

Specifically, CPU 23 performs main search which repeating the selection of frequencies for detailed search according to the second type frequency pattern, which is stored in the second type frequency pattern data 255, and a correlation operation at each frequency for detailed search while shifting the search center frequency. In this case, CPU 23 executes the correlation operation during the second type correlation integration time 2614 and stores the acquired correlation value in the second correlation value data 2616 so as to match the frequency. CPU 23 determines a frequency for detailed search, at which the correlation value becomes a maximum, by the main search and decides the frequency as a capture frequency.

On the other hand, if it is determined that the correlation operation has not been executed yet for the frequency for a side lobe check in step D11 (step D11; No), CPU 23 performs a second electric field frequency search by reading and executing the second electric field frequency search program 2515 stored in the storage section 25 (step D15).

Figure 13:
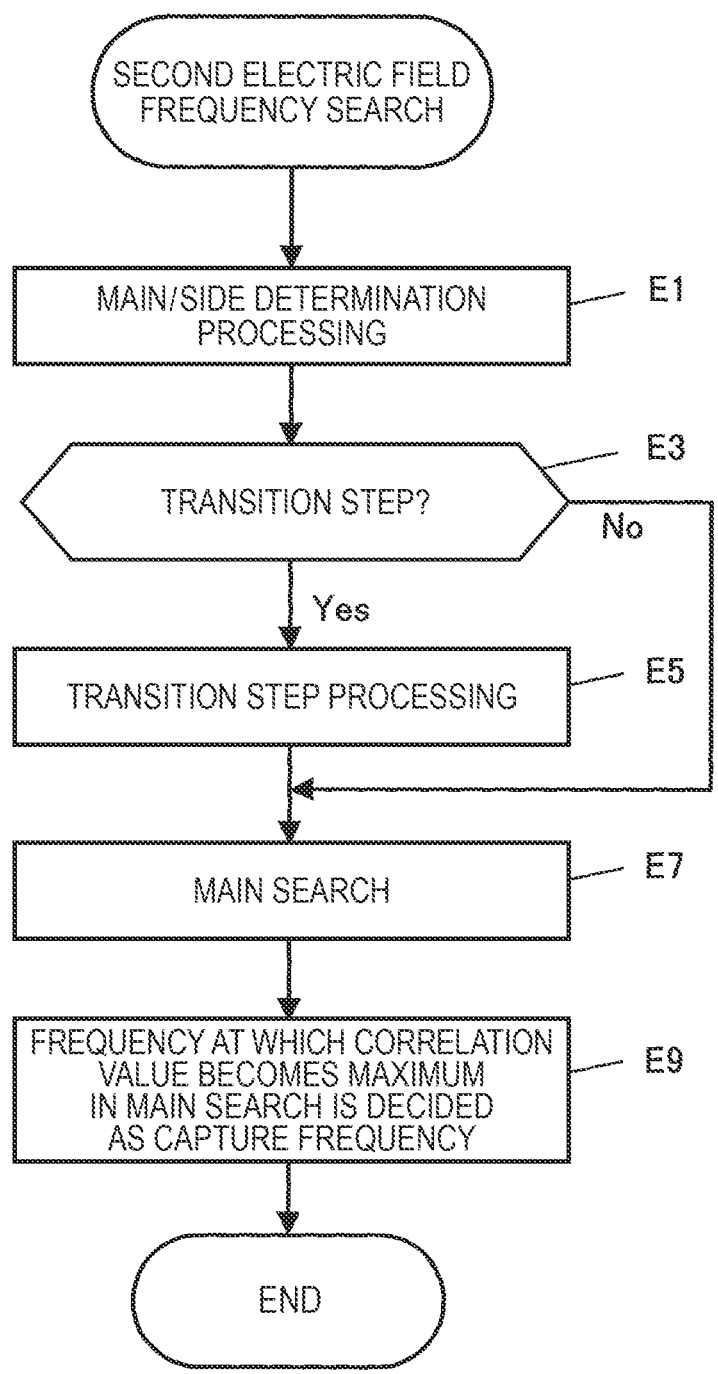
FIG. 13 is a flow chart showing the flow of a second electric field frequency search.

FIG. 13 is a flow chart showing the flow of the second electric field frequency search.

First, CPU 23 performs main/side determination processing (step E1). Then, CPU 23 determines whether or not to execute processing of a transition step (step E3). Specifically, in the main/side determination processing, CPU 23 determines whether or not the frequency, at which the correlation value becomes a maximum, is a frequency for a side lobe check. If it is determined to be a frequency for a side lobe check (step E3; Yes), transition step processing is performed (step E5).

On the other hand, if it is determined that the frequency at which the correlation value becomes a maximum is not a frequency for a side lobe check (step E3; No) or after performing the transition step processing in step E5, CPU 23 performs a main search (step E7). Specifically, in the main/side determination processing or the transition step processing, a search frequency at which the correlation value becomes a maximum is set as a search center frequency which is a reference frequency in the main search. Similar to the first electric field frequency search, the selection of frequencies for detailed search according to the second type frequency pattern and a correlation operation are repeated while shifting the search center frequency.

Then, CPU 23 determines a search frequency at which the correlation value becomes a maximum in the main search and decides the search frequency as a capture frequency (step E9). CPU 23 ends the second electric field frequency search.

Returning to the second type correlation operation shown in FIG. 12, CPU 23 ends the first electric field frequency search or the second electric field frequency search and then ends the second type correlation operation. Returning to the capture frequency decision processing shown in FIG. 10, CPU 23 performs the second type correlation operation and then ends the capture frequency decision processing.

Returning to the baseband processing in FIG. 9, CPU 23 performs the capture frequency decision processing and then makes the satellite capturing section 21 capture a GPS satellite signal from the satellite to be captured at the decided capture frequency (step A7). Then, CPU 23 shifts the processing to the next satellite to be captured.

Although a detailed explanation is omitted in the present embodiment, a correlation operation in the phase direction between a received signal and a replica code is performed using a capture frequency and a phase, at which the correlation value becomes a maximum, is detected as a code phase in capturing of a GPS satellite signal. The code phase is used in calculation of a pseudo distance and the like.

After performing the processing of steps A5 and A7 for all satellites to be captured, CPU 23 ends the processing of the loop A (step A9). Then, CPU 23 calculates the satellite information, such as satellite position, satellite traveling speed, and satellite movement direction of a captured satellite, on the basis of a navigation message included in the captured GPS satellite signal (step A11).

CPU 23 performs GPS position calculation processing for calculating the position by performing position calculation, for example, using a pseudo distance on the basis of the satellite information calculated in step A11 and stores the calculated position in the storage section 25 as the GPS calculation position 265 (step A13). Since the position calculation is known, a detailed explanation thereof will be omitted.

Then, CPU 23 outputs the GPS calculation position 265 to the host CPU 30 (step A15). Then, the CPU 23 determines whether or not the position calculation has ended (step A17). If it is determined that the position calculation has not ended yet (step A17; No), the process returns to step A1. If it is determined that the position calculation has ended (step A17; Yes), the baseband processing is ended.

5. Operations and Effects

According to the present embodiment, the first type correlation operation which is a rough frequency search (first frequency search) is executed on a received signal from a GPS satellite. A frequency between a main lobe and a side lobe is calculated on the basis of the first type correlation integration time which is a correlation integration time used in the first type correlation operation, and a frequency for a side lobe check is set using the frequency and a frequency at which the correlation value becomes a maximum in the first type correlation integration processing. A plurality of search frequencies including the frequency, at which the correlation value becomes a maximum in the first type correlation integration processing, and the frequency for a side lobe check are selected, and the second type correlation operation is performed at each of the selected search frequencies. A search frequency at which the correlation value becomes a maximum in the second type correlation operation is determined, and the search frequency is decided as a capture frequency.

In the second type correlation operation, a frequency at which the correlation value becomes a maximum in the first type correlation operation is set as a search center frequency, and search frequencies including the frequency for a side lobe check are selected according to the frequency pattern set beforehand. The correlation operation is performed at each search frequency. If the search frequency at which the correlation value becomes a maximum is a frequency for a side lobe check, the search center frequency is updated to the frequency for a side lobe check. Search frequencies including the frequency for a side lobe check are selected again according to the frequency pattern, and the correlation operation is executed at each search frequency. The series of processing is repeated until the search frequency, at which the correlation value is a maximum, does not become a frequency for a side lobe check (second frequency search). When the correlation value becomes a maximum at a frequency other than the frequency for a side lobe check, the side lobe check is ended, and the process proceeds to a main search (third frequency search) for a frequency set as a capture frequency of a GPS satellite signal.

The capture frequency can be correctly obtained by executing the first type correlation operation, which is a rough frequency search, first and then executing the second type correlation operation at each of the selected search frequencies on the basis of the result. In this case, it is possible to prevent a frequency of a side lobe portion from being erroneously detected by setting a frequency for a side lobe check on the basis of the correlation integration time used in the first type correlation operation and executing the second type correlation operation at search frequencies including the frequency for a side lobe check.

In the present embodiment, the distance between frequencies is gradually narrowed by repeatedly executing the selection of a search frequency and the correlation operation in the second type correlation operation. In the main search step performed last, the selection of frequencies for detailed search and the correlation operation at each of the frequencies for detailed search are repeatedly performed. By performing such processing, a capture frequency can be acquired with high precision.

6. Modifications 6-1. Application System

In the above embodiment, a GPS satellite signal was mentioned as an example of a CDMA signal, and a method of deciding a capture frequency in a GPS receiver was described. However, the invention may also be similarly applied to a receiver which receives a signal other than the GPS satellite signal. Preferably, it may be a receiver which receives a signal spread-modulated by the CDMA method and which is configured to capture a CDMA signal by performing a correlation operation using a spread code replica.

6-2. Electronic Apparatus

In the above embodiment, the case has been described in which the invention is applied to a mobile phone, which is a kind of electronic apparatus. However, the electronic apparatus to which the invention can be applied is not limited thereto. For example, the invention may be similarly applied to other electronic apparatuses, such as car navigation apparatuses, portable navigation apparatuses, personal computers, PDAs (Personal Digital Assistants), and wristwatches.

6-3. Satellite Position Calculating System

In the above embodiment, an explanation has been made using a GPS as an example of a satellite position calculating system. However, other satellite position calculating systems may also be used, such as WAAS (Wide Area Augmentation System), QZSS (Quasi Zenith Satellite System), GLONASS (Global Navigation Satellite System), and GALILEO.

6-4. Frequency Pattern

In the embodiment described above, in the second type correlation operation, a search frequency is selected by applying the same frequency pattern in the main/side determination step, the transition step, and the main search step. However, the search frequency may be selected by changing the frequency pattern in each step.

FIG. 14 shows an example of the data configuration of second type frequency pattern data 257 which is data that sets a second type frequency pattern in this modification. In the second type frequency pattern data 257, a frequency distance between adjacent frequencies set in the frequency pattern narrows as a step progresses to the main/side determination step, the transition step, and the main search step. This is because a frequency search is correctly performed as a step progresses.

In the embodiment described above, a pattern in which seven frequencies are selected as search frequencies is set in the second type correlation operation. However, the number of frequencies selected may also be changed. Since it is thought that it is necessary to search a frequency more precisely as a step progresses to the main/side determination step, the transition step, and the main search step, it is preferable to set a frequency pattern such that a more number of frequencies are selected as search frequencies as a step progresses.

FIG. 15 shows an example of the data configuration of second type frequency pattern data 259 which is data that sets a second type frequency pattern in this modification. In the second type frequency pattern data 259, a frequency pattern is set such that the number of frequencies selected as search frequencies increases as a step progresses to the main/side determination step, the transition step, and the main search step.

By combination of the frequency patterns described in FIGS. 14 and 15, it is also possible to set a pattern in which a frequency distance between adjacent search frequencies narrows or the number of search frequencies selected increases as a step progresses. In this case, since it is possible to search a frequency by raising the resolution as a step progresses, the accuracy of the frequency search can be further improved.

6-5. Main/Side Frequency Difference

In the above embodiment, the case of calculating the main/side frequency difference "Δf" according to the expression (1) was described as an example. However, the main/side frequency difference "Δf" may also be calculated using other approximate expressions as long as they can approximate frequencies between the main lobe and the side lobe.

Instead of calculating the main/side frequency difference "Δf" using an approximate expression, it is also possible to set a table, which sets the correspondence relationship between the correlation integration time "t" and the main/side frequency difference "Δf" in advance and to read the main/side frequency difference "Δf" from the table in order to set a frequency for a side lobe check. Thus, "Δf" may be determined or generated from the table as well as a formula.

6-6. Side Lobe Check

It may also be set manually whether to perform a side lobe check. Specifically, for example, a flag for a side lobe check is prepared. Then, if an operation which instructs the execution of a side lobe check is performed by the user in initial setting, the flag is set to ON. In the second type correlation operation, a side lobe check is performed when the flag is set to ON, and the side lobe check is not performed when the flag is set to OFF.

What is claimed is:

1. A capture frequency decision method of deciding a capture frequency by executing a frequency search in which a correlation operation on a received Code Division Multiple Access signal is performed at a plurality of search frequencies, the method comprising:
    selecting a correlation integration time;
    executing a first frequency search of performing the correlation operation using the selected correlation integration time at a plurality of first search frequencies;
    determining a side lobe frequency offset for a second frequency search, wherein the side lobe frequency offset varies with the selected correlation integration time of the first frequency search;
    setting a frequency for a side lobe check on the basis of the determined side lobe frequency offset;
    selecting a plurality of second search frequencies including the frequency for the side lobe check on the basis of a result of the first frequency search;
    executing the second frequency search of performing the correlation operation at the plurality of selected second search frequencies including the frequency for the side lobe check; and
    deciding a capture frequency by executing a third frequency search using a result of the second frequency search,
    wherein an interval between frequencies of the plurality of second search frequencies including the frequency for the side lobe check is narrower than an interval between frequencies of the plurality of first search frequencies.

2. The capture frequency decision method according to claim 1,
    wherein the setting of the frequency for a side lobe check includes setting the frequency for a side lobe check using a difference between frequencies of a main lobe and a side lobe set according to the correlation integration time, and
    wherein the executing of the third frequency search includes executing a frequency search on the basis of a search frequency which is acquired by the second frequency search and at which a correlation value was a maximum in the second frequency search.

3. The capture frequency decision method according to claim 1, further comprising:
    performing, when the second frequency search determines that that the maximum correlation value for the selected plurality of search frequencies occurs at a frequency for a side lobe check, a second execution of the second frequency search using a set of new search frequencies that includes a new frequency for a new side lobe check, the new frequency being different from the prior frequency for a side lobe check at which a maximum correlation value occurred.

4. The capture frequency decision method according to claim 3,
    wherein performing the second execution of the second search frequency search includes setting the new frequency for a new side lobe check to a larger frequency than the prior frequency when the search frequency at which the correlation value is a maximum in the first execution of the second frequency search is larger than a search frequency at which the correlation value is a maximum in the first frequency search.

5. The capture frequency decision method according to claim 3,
wherein performing the second execution of the second search frequency search includes setting the new frequency for a new side lobe check to a smaller frequency than the prior frequency when the search frequency at which the correlation value is a maximum in the first execution of the second frequency search is smaller than a search frequency at which the correlation value is a maximum in the first frequency search.

6. The capture frequency decision method according to claim 1, further comprising:
determining whether or not the frequency for a side lobe check is used in the second frequency search on the basis of a signal strength of the received signal,
wherein in the executing of the second frequency search, the correlation operation is performed at a plurality of second search frequencies including the frequency for a side lobe check when it is determined that the frequency for a side lobe check is used and the correlation operation is performed at a different search frequency from the frequency for a side lobe check when it is determined that the frequency for a side lobe check is not used.

7. The capture frequency decision method according to claim 1,
wherein the selecting of the plurality of second search frequencies includes selecting a frequency, which is selected using a search frequency pattern used when selecting a search frequency on the basis of a predetermined reference frequency, and the frequency for a side lobe check as search frequencies used in the second frequency search, and
wherein the executing of the third frequency search includes:
selecting a frequency for detailed search in the third frequency search using the search frequency pattern with the search frequency, which is acquired by the second frequency search and at which the correlation value is a maximum, as the reference frequency;
executing a detailed frequency search of performing the correlation operation at the frequency for detailed search; and
repeating selection of the frequency for detailed search and the detailed frequency search using a frequency for detailed search, which is acquired by the detailed frequency search and at which the correlation value is a maximum, as the new reference frequency.

8. The capture frequency decision method according to claim 1, wherein the side lobe frequency offset is inversely proportional to the selected correlation integration time of the first frequency search.

9. A receiver that captures a CDMA signal, which is a received signal, by deciding a capture frequency by executing a frequency search of performing a correlation operation on the CDMA signal in a frequency direction, the receiver comprising:
a first search executing section that selects a correlation integration time and executes a first frequency search of performing the correlation operation using the selected correlation integration time at a plurality of first search frequencies;
a setting section that determines a side lobe frequency offset for a second frequency search, and sets a frequency for a side lobe check on the basis of the determined side lobe frequency offset, wherein the side lobe frequency offset varies with the selected correlation integration time of the first frequency search;
a second search frequency selecting section that selects a plurality of second search frequencies including the frequency for the side lobe check on the basis of a result of the first frequency search;
a second frequency search executing section that executes the second frequency search of performing the correlation operation at the plurality of selected search frequencies including the frequency for the side lobe check; and
a capture frequency deciding section that decides a capture frequency by executing a third frequency search using a result of the second frequency search,
wherein an interval between frequencies of the plurality of second search frequencies including the frequency for the side lobe check is narrower than an interval between frequencies of the plurality of first search frequencies.

10. The receiver according to claim 9, wherein the side lobe frequency offset is inversely proportional to the selected correlation integration time of the first frequency search.

* * * * *